(No Model.)
H. HANSEN.
BALL BEARING.
No. 600,311. Patented Mar. 8, 1898.
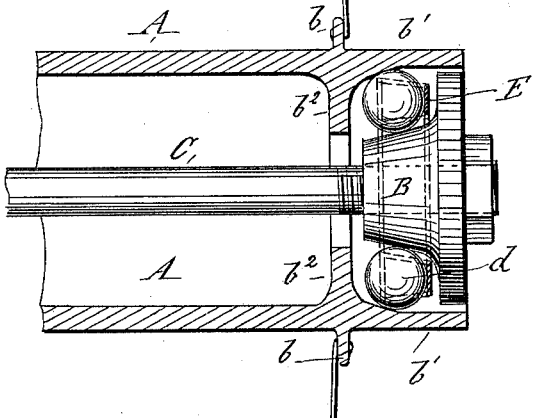
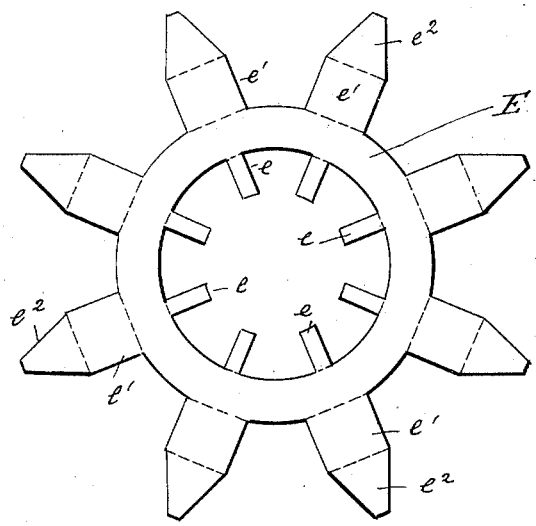
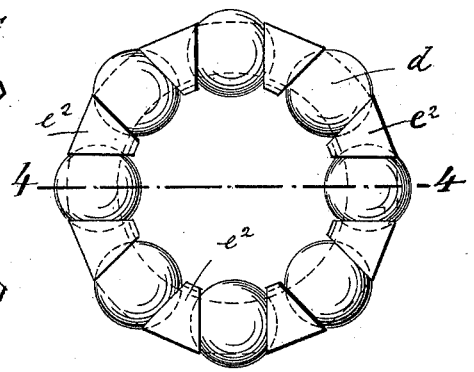
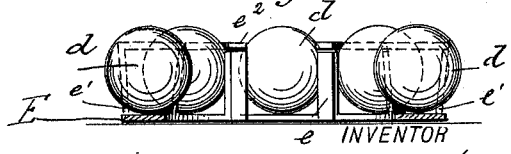
WITNESSES:
Charles Fraukel
Harry M. Hillner
INVENTOR
Hermann Hansen
BY Charles Karp
ATTORNEY.

UNITED STATES PATENT OFFICE.

HERMANN HANSEN, OF NEW YORK, N. Y., ASSIGNOR TO GUSTAVUS EMIL STRAUSS, OF SAME PLACE.

BALL-BEARING.

SPECIFICATION forming part of Letters Patent No. 600,311, dated March 8, 1898.

Application filed March 1, 1897. Serial No. 625,533. (No model.)

*To all whom it may concern:*

Be it known that I, HERMANN HANSEN, a citizen of the United States, and a resident of New York, in the county of New York and State of New York, have invented certain new and useful Improvements in Ball-Bearings, of which the following is a specification.

My invention has reference to improvements in ball-bearings, and has the object to provide ball-bearings with ball-retaining devices of a special construction by means of which the balls can be easily and quickly attached to the axle or shaft and removed therefrom and which are adapted to hold the balls in their seats when the devices are removed from the bearing.

In the accompanying drawings, Figure 1 is a longitudinal section of a portion of a hub with my ball-retaining devices. Fig. 2 shows a blank of which the retaining device is made. Fig. 3 is a top view of the device with the balls held therein; and Fig. 4 is a section on line 4 4, Fig. 3.

Similar letters of reference indicate corresponding parts.

Referring to the drawings, A represents a hub, of which only one end portion is shown, having on each end an upwardly-extending flange $b$ to bear the spokes of the wheel and a lateral extension $b'$, which forms, with an inwardly-extending flange $b^2$, the curved or conical wall of a ball-chamber, as usual in ball-bearings.

C is the axle or shaft, which bears on one end a cone that is not shown in the drawings and on the other end a second cone B, screwed upon the axle or shaft, which for this purpose is screw-threaded.

The cones B and the flanges $b^2$, with the extensions $b'$, form the chambers for the balls, which latter are held in ball-retaining devices E, one in each chamber. Each retaining device consists of a flat ring of sheet metal or other suitable material, which has inwardly-projecting flaps $e$ and outwardly-projecting flaps $e'$, which are located in the same radius with the flaps $e$. The flaps $e'$ are wider than the flaps $e$ and have outer tapering extensions $e^2$, integral with or soldered to the same. The flaps are bent upward in one direction, so that they stand erected opposite each other, and the balls $d$ are then placed upon the base or flat ring of the device between the flaps, so that one ball is located in one place formed by the said flaps, and the extensions $e^2$ are then bent inwardly, so that the pointed ends of the same come in contact with the tops of the corresponding inner flaps $e$, as shown in Figs. 3 and 4. The flaps and the extensions bent as described form thus seats for the balls, on which they can freely revolve and from which they project in three directions—namely, in the top portion and the inner and outer sides of the device.

The devices holding the balls are so placed into the ball-chambers that the balls therein come with their portions projecting beyond the devices in contact with the inner walls of the chambers, as illustrated in Fig. 1.

It is a fact that in the common ball-bearings a certain friction is caused by the pressure of the balls upon each other, which friction is often increased by the circumstance that some of the balls have a smaller or larger diameter. This disadvantage is done away with by my ball-retainer, as the balls are kept separate from each other and smaller balls are carried along without causing any injurious influence.

It is evident that my improved ball-retaining device can be used for ball-bearings in vehicle-wheels as well as in machinery.

I do not claim, broadly, in a ball-bearing, a ball-holding device consisting of a flat ring having a series of inner and outer side flaps radially opposite each other and extending upwardly from the ring and balls held in the spaces between the inner and outer flaps, so that they project beyond the ring and side flaps in the inner and outer and in the upward directions.

Having thus described my invention, I claim as new and desire to secure by Letters Patent—

1. In a ball-bearing a ball-retaining device consisting of a flat ring having inner upwardly-extending flaps and outer upwardly-extending flaps of a larger width opposite the inner flaps and being provided with tapering extensions which are so bent that they come in contact with the tops of the inner flaps, substantially as set forth.

2. The combination of a hub having inner flanges, with an axle having cones forming chambers with the said flanges, and in each chamber a ball-retaining device consisting of a flat ring having inner upwardly-extending flaps and outer upwardly-extending flaps of a larger width opposite the inner flaps and being provided with tapering extensions which are so bent that they come in contact with the tops of the inner flaps, and balls held between the corresponding inner and outer flaps and projecting beyond the top portion of the device and the inner and outer sides of the same, substantially as set forth.

3. For a ball-retaining device for ball-bearings a blank consisting of a flat ring having inner flaps and outer flaps, the latter being of a larger width than the inner flaps and being provided with tapering extensions, substantially as set forth.

Signed at New York, in the county of New York and State of New York, this 18th day of February, A. D. 1897.

HERMANN HANSEN.

Witnesses:
CHARLES KARP,
CHARLES FRANKEL.